(12) United States Patent
Yoo et al.

(10) Patent No.: US 11,139,543 B2
(45) Date of Patent: Oct. 5, 2021

(54) BUS BAR INCLUDING CURRENT BREAKING PORTION AND BATTERY MODULE INCLUDING THE SAME

(71) Applicant: LG Chem, Ltd., Seoul (KR)

(72) Inventors: Jae-Min Yoo, Daejeon (KR); Min-Ho Kwon, Daejeon (KR); Jae-Uk Ryu, Daejeon (KR); Dal-Mo Kang, Daejeon (KR); Su-Chang Kim, Daejeon (KR); Jeong-O Mun, Daejeon (KR); Ji-Su Yoon, Daejeon (KR)

(73) Assignee: LG Chem, Ltd.

( * ) Notice: Subject to any disclaimer, the term of this patent is extended or adjusted under 35 U.S.C. 154(b) by 25 days.

(21) Appl. No.: 16/632,776

(22) PCT Filed: Jan. 21, 2019

(86) PCT No.: PCT/KR2019/000852
§ 371 (c)(1),
(2) Date: Jan. 21, 2020

(87) PCT Pub. No.: WO2019/156390
PCT Pub. Date: Aug. 15, 2019

(65) Prior Publication Data
US 2020/0168887 A1    May 28, 2020

(30) Foreign Application Priority Data
Feb. 9, 2018   (KR) .................. 10-2018-0016388

(51) Int. Cl.
*H01M 50/581* (2021.01)
*H01M 50/502* (2021.01)

(52) U.S. Cl.
CPC ....... *H01M 50/581* (2021.01); *H01M 50/502* (2021.01); *H01M 2200/103* (2013.01)

(58) Field of Classification Search
None
See application file for complete search history.

(56) References Cited

U.S. PATENT DOCUMENTS

| 2008/0280198 A1 | 11/2008 | Kumar et al. |
| 2013/0236752 A1 | 9/2013 | Yang et al. |

(Continued)

FOREIGN PATENT DOCUMENTS

| JP | H11317301 A | 11/1999 |
| JP | 2007280898 A | 10/2007 |

(Continued)

OTHER PUBLICATIONS

International Search Report for Application No. PCT/KR2019/000852 dated May 10, 2019, 2 pages.

*Primary Examiner* — Wyatt P McConnell
(74) *Attorney, Agent, or Firm* — Lerner, David, Littenberg, Krumholz & Mentlik, LLP

(57) ABSTRACT

A bus bar capable of effectively securing safety of a battery module when an overcurrent is generated includes: a main body portion that includes a first metal, has a stepped structure, in which an outer surface of the main body portion in an outward direction of the battery module is recessed in an inward direction, formed in one region, and is configured to be electrically connected to at least one secondary battery; a current breaking portion that is inserted into a space formed by the stepped structure and includes a second metal having a melting point relatively lower than a melting point of the first metal; and a covering member configured to surround at least a part of an outer surface of the current breaking portion. A battery module including the bus bar is also provided.

20 Claims, 12 Drawing Sheets

(56) References Cited

U.S. PATENT DOCUMENTS

| | | | |
|---|---|---|---|
| 2014/0065467 A1 | 3/2014 | Choi et al. | |
| 2014/0178742 A1* | 6/2014 | Krahn | H01M 50/116 429/151 |
| 2015/0017507 A1* | 1/2015 | Yang | H01M 50/572 429/121 |
| 2015/0140390 A1 | 5/2015 | Choi | |

FOREIGN PATENT DOCUMENTS

| | | |
|---|---|---|
| JP | 2013026226 A | 2/2013 |
| JP | 2014530456 A | 11/2014 |
| JP | 2015053260 A | 3/2015 |
| JP | 2016521449 A | 7/2016 |
| KR | 20120059135 A | 6/2012 |
| KR | 20130080023 A | 7/2013 |
| KR | 20140028943 A | 3/2014 |
| KR | 20140080120 A | 6/2014 |
| KR | 20150058730 A | 5/2015 |
| KR | 101632417 B1 | 6/2016 |
| KR | 101812273 B1 | 12/2017 |

\* cited by examiner

BUS BAR INCLUDING CURRENT BREAKING PORTION AND BATTERY MODULE INCLUDING THE SAME

CROSS-REFERENCE TO RELATED APPLICATIONS

The present application is a national phase entry under 35 U.S.C. § 371 of International Application No. PCT/KR2019/000852, filed Jan. 21, 2019, which claims priority to Korean Patent Application No. 10-2018-0016388 filed on Feb. 9, 2018 in the Republic of Korea, the disclosures of which are incorporated herein by reference.

TECHNICAL FIELD

The present disclosure relates to a bus bar including a current breaking portion and a battery module including the same, and more particularly, to a bus bar capable of effectively securing safety of a battery module when an overcurrent is generated, and a battery module including the same.

BACKGROUND ART

Recently, with the rapid increase in demands for portable electronic products, such as laptop computers, video cameras, portable phones, and the like, and the regularization of development of electric vehicles, energy storage batteries, robots, satellites, and the like, high-performance secondary batteries capable of being repeatedly charged and discharged have been actively studied.

Currently commercialized secondary batteries include nickel cadmium batteries, nickel hydrogen batteries, nickel zinc batteries, lithium secondary batteries, etc. and the lithium secondary batteries thereamong are receiving attention according advantages of free charging/discharging, a very low self-discharge rate, and high energy density since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate on which the positive electrode active material and the negative electrode active material are respectively coated are arranged with a separator therebetween, and an exterior material, i.e., a battery pouch exterior material, sealing and accommodating the electrode assembly together with an electrolyte solution.

Generally, the lithium secondary battery may be classified into a can-type secondary battery, in which the electrode assembly is embedded in a metal can, and a pouch type secondary battery, in which the electrode assembly is embedded in a pouch of an aluminum laminate sheet, according to a shape of the exterior material.

Recently, the secondary battery is widely used not only in a small-sized apparatus, such as a portable electronic device, but also in medium- and large-sized apparatuses, such as a vehicle or an energy storage apparatus. When the secondary battery is used in the medium- and large-sized apparatuses, a large number of secondary batteries are electrically connected to increase capacity and output. In particular, the pouch type secondary battery is mostly used in such medium- and large-sized apparatuses due to easy stacking.

Also, in order for the secondary batteries to be electrically connected inside a battery module, electrode leads may be connected to each other and a connected portion may be welded to maintain such a connected state. Moreover, the battery module may have parallel and/or series electric connection between the secondary batteries, and in this case, one end portion of the electrode lead may contact and be fixed to a bus bar for electric connection between the secondary batteries, via welding or the like.

The electric connection between the secondary batteries is often configured by bonding the electrode lead to the bus bar. In this case, in order to electrically connect the secondary batteries in parallel, the electrode leads of same polarity are connected and bonded to each other, and in order to electrically connect the secondary batteries in series, the electrode leads of different polarities are connected and bonded to each other.

In the related art, a bus bar having a plate shape is used to electrically connect a plurality of secondary batteries of a battery module. Also, the bus bar is connected to electrode terminals of a plurality of unit cells and is connected to a power cable. Accordingly, a current of the unit cells may be discharged to the power cable through the bus bar or may be charged into the unit cells through the bus bar connected to an external power source via the power cable.

However, when an overcurrent of the battery module is generated, thermal runaway or the like may occur in the plurality of secondary batteries, and thus the battery module may explode or ignite. Moreover, current crowding may occur in the bus bar connected to an external apparatus and accordingly, components around the bus bar may be damaged due to high heat generated in the bus bar. Accordingly, it may be difficult to stably use the battery module in a high capacity electric vehicle.

Accordingly, in the related art, an electric component for controlling power when the overcurrent is generated in the battery module to prevent a problem from occurring in an external device or the battery module is provided. However, when the electric component is overloaded or malfunctions, the electric component may be unable to function properly. In this regard, the battery module of the related art includes a fuse to block electric connection with the outside in addition to the electric component.

However, when the fuse is mounted in the battery module, components, such as a housing and the like, around the fuse may be thermally damaged. Moreover, when the fuse is mounted in the battery module, a large space is occupied and thus energy density of the battery module may be reduced. In addition, including a separate fuse causes a large increase in manufacturing costs of the battery module, and thus is not suitable.

Accordingly, it is necessary to develop a technology for increasing stability of a battery module to solve such a problem.

DISCLOSURE

Technical Problem

The present disclosure is designed to solve the problems of the related art, and therefore the present disclosure is directed to providing a bus bar capable of effectively securing safety of a battery module when an overcurrent is generated, and a battery module including the same.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a bus bar including: a main body portion that is configured to be included in a battery module, includes a first metal, has a stepped structure, in which an outer surface of the main body portion in an outward direction of the battery module is recessed in an inward direction, formed in one region, and is configured to be electrically connected to at least one secondary battery; a current breaking portion that is inserted into a space formed by the stepped structure and includes a second metal having a melting point relatively lower than a melting point of the first metal; and a covering member configured to surround at least a part of an outer surface of the current breaking portion.

Also, the current breaking portion may be configured to electrically connect an upper wall and a lower wall of the space of the stepped structure, which are spaced apart from each other.

Moreover, an area of a cross section of a stepped region of the stepped structure perpendicular to a current flow direction may be less than an area of a cross section of the current breaking portion perpendicular to the current flow direction.

In addition, an outer side surface of a stepped region of the stepped structure may be located to face an inner side surface of the current breaking portion.

Also, the bus bar may further include an extending portion extending to connect the upper wall and the lower wall of the recessed space of the stepped structure and covering an outer side surface of the current breaking portion.

Moreover, at least one slit may be provided in the current breaking portion.

Also, the covering member may include a discharge hole perforated to communicate with an inside and an outside of the bus bar.

In addition, a stepped region of the stepped structure may include a through hole perforated to communicate with the inside and the outside of the bus bar.

Moreover, the current breaking portion may have a protruding structure extending and protruding from one region to penetrate the through hole provided at the stepped region of the stepped structure Also, the through hole provided at the stepped region of the stepped structure may be located to communicate with the discharge hole of the covering member.

Furthermore, the covering member may be a mica sheet.

In another aspect of the present disclosure, there is also provided a battery module including: a plurality of secondary batteries; the bus bar configured to electrically connect the plurality of secondary batteries; and a bus bar frame including an electrically insulating material and configured to mount the bus bar on an outer side surface thereof.

In another aspect of the present disclosure, there is also provided a battery pack including at least one battery module according to the present disclosure.

In another aspect of the present disclosure, there is also provided a vehicle including the battery pack according to the present disclosure.

Advantageous Effects

According to an aspect of the present disclosure, by forming a stepped structure of a main body portion, a bus bar is configured such that, when a predetermined overcurrent or larger flows in the bus bar, the stepped structure of the main body portion can be melted and broken due to high resistance heat, and thus the bus bar can perform a fuse function according to the stepped structure, thereby increasing safety of a battery module.

Also, according to such an aspect of the present disclosure, in the bus bar, by forming a current breaking portion in an internal space formed by the stepped structure of the main body portion, when an overcurrent is applied, the current breaking portion and the stepped structure of the main body portion are quickly melted and lost, and thus disconnection can be quickly achieved.

In addition, according to an aspect of the present disclosure, since the main body portion and the current breaking portion are mechanically combined via rolling, not only electrical connectivity between the main body portion and the current breaking portion is very superior, but also a bonding property is excellent, and thus durability of the bus bar can be prevented from being deteriorated.

Also, according to an aspect of the present disclosure, by forming the thickness or cross-sectional area of the stepped structure of the main body portion to be less than the thickness or cross-sectional area of the current breaking portion, high resistance can be generated at a stepped region of the stepped structure of the main body portion and the stepped structure of the main body portion can be definitely and quickly broken because a thickness or area to be melted is small. In other words, reliability of the fuse function of the bus bar of the present disclosure can be greatly increased.

Moreover, according to an aspect of the present disclosure, since a covering member surrounds at least a part of an outer surface of the current breaking portion, when an overcurrent is applied to the bus bar, heat can be blocked such that high heat generated in the current breaking portion does not damage components adjacent to the bus bar. Furthermore, since the covering member insulates the current breaking portion, when the overcurrent is applied to the bus bar, the temperature of the current breaking portion can be quickly increased. Accordingly, reactivity of the bus bar of the present disclosure with respect to the overcurrent can be increased, and thus a quick current breaking function can be exhibited.

In addition, according to another aspect of the present disclosure, by forming a discharge hole at the covering member, the melted current breaking portion or the melted stepped region of the stepped structure of the main body portion can be smoothly discharged to the outside through the discharge hole. Accordingly, the reactivity of the bus bar of the present disclosure with respect to the overcurrent can be further increased, and thus quick disconnection can be achieved.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
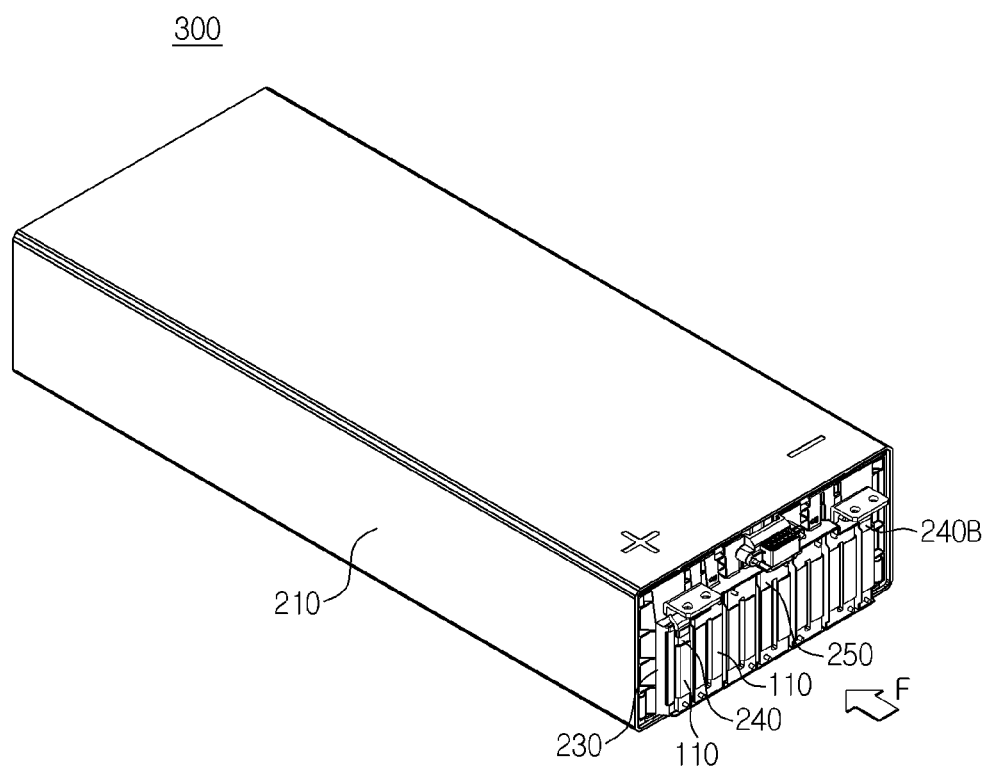
FIG. 1 is a perspective view schematically showing a battery module according to an embodiment of the present disclosure.
Figure 2:
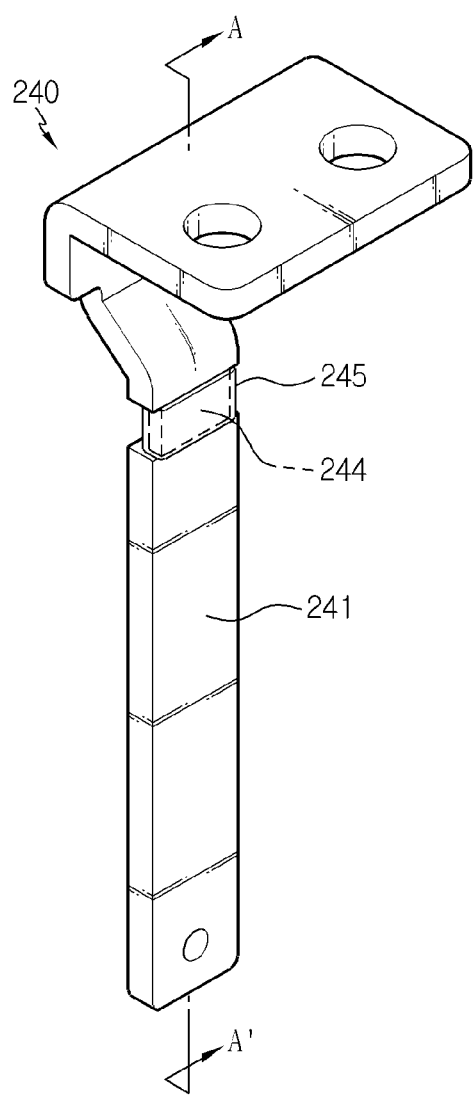
FIG. 2 is a perspective view schematically showing a bus bar according to an embodiment of the present disclosure.
Figure 3:
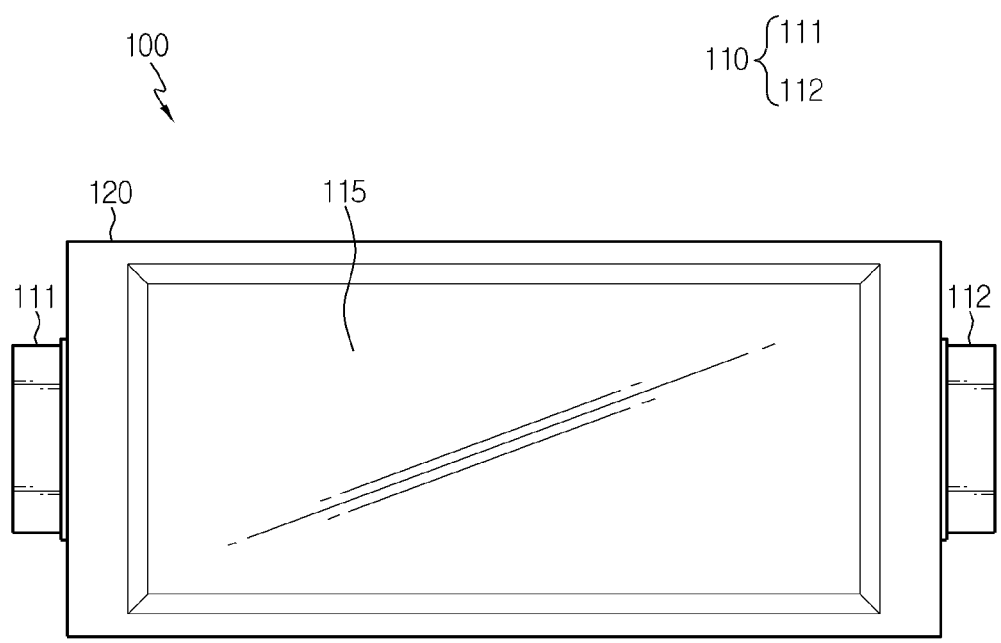
FIG. 3 is a side view schematically showing a secondary battery according to an embodiment of the present disclosure.
Figure 4:
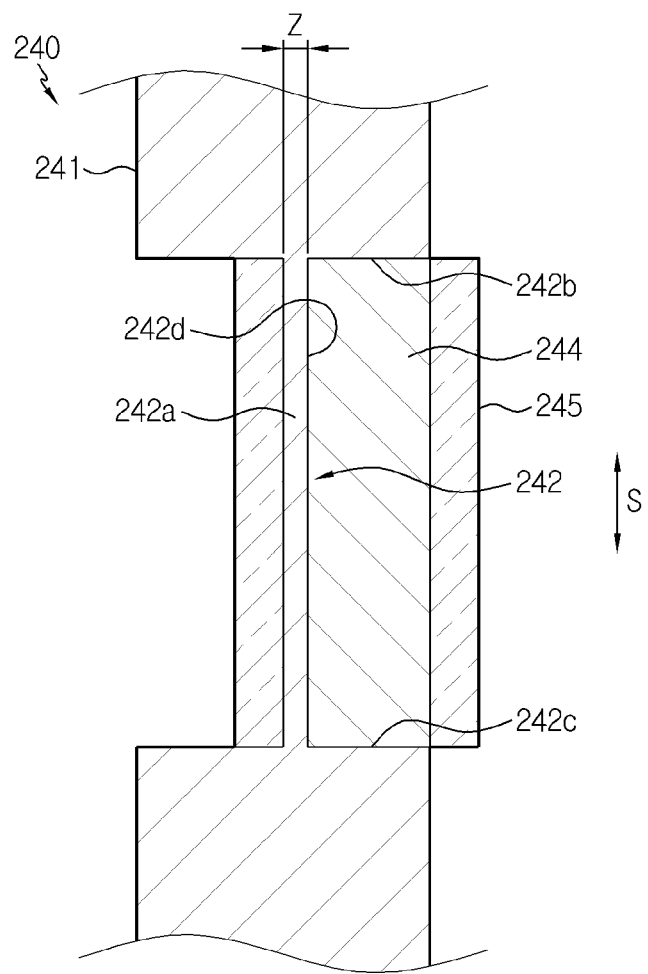
FIG. 4 is a partial cross-sectional view schematically showing one region of a bus bar taken along a line A-A' of FIG. 2.

FIG. 1 is a perspective view schematically showing a battery module according to an embodiment of the present disclosure. FIG. 2 is a perspective view schematically showing a bus bar according to an embodiment of the present disclosure. FIG. 3 is a side view schematically showing a secondary battery according to an embodiment of the present disclosure. Also, FIG. 4 is a partial cross-sectional view schematically showing one region of a bus bar taken along a line A-A' of FIG. 2.

Referring to FIGS. 1 through 4, a bus bar 240 according to an embodiment of the present disclosure includes a main body portion 241, a current breaking portion 244 (displayed in a hidden outline), and a covering member 245. Also, a battery module 300 according to an embodiment of the present disclosure may include at least one bus bar 240 to electrically connect a plurality of secondary batteries 100.

Here, the main body portion 241 may include a first metal. The first metal may be a material having high electric conduction for delivering electricity with a power loss of less than 40%. For example, the first metal may be copper. However, the first metal is not limited to copper, and may be any metal having high electric conduction like copper, and for example, a copper alloy or gold may be used.

Also, the main body portion 241 may have a bar shape elongated in an up-and-down direction when viewed from a direction indicated by an arrow F of FIG. 1. In addition, a stepped structure 242 may be formed at one region of the main body portion 241 having the bar shape, such that an outer surface of the battery module 300 in an outward direction is recessed inward based on a center portion of an overall shape of the battery module 300. Here, an outward direction of the battery module 300 denotes a direction facing relatively the outside based on the center portion of the battery module 300. On the other hand, an inward direction of the battery module 300 denotes a direction facing the center portion of the battery module 300 from the outside. Thus, in the present specification, the 'outward direction' and the 'inward direction' may be abbreviated to 'outward' and 'inward'.

In other words, a stepped region 242a of the stepped structure 242 may be configured such that a region of the main body portion 241 has a thickness Z in a front-and-back direction relatively thinner than remaining regions. Meanwhile, in the present specification, unless otherwise specified, up, down, front, back, left, and right directions are distinguished based on the direction indicated by the arrow F.

Also, the stepped structure 242 may provide a predetermined space as an outer surface of the main body portion 241 in the outward direction is recessed in the inward direction. Also, the stepped structure 242 may have a structure in which an outer surface of the main body portion 241 in the inward direction is recessed in the outward direction. In other words, the stepped region 242a of the stepped structure 242 may be recessed in both outer surfaces in the outward direction and the inward direction.

In addition, the stepped structure 242 may include an upper wall 242b and a lower wall 242c spaced apart from each other with a predetermined space therebetween. Also, the stepped structure 242 may include an inner side wall 242d in the inward direction.

Thus, according to such a configuration of the present disclosure, by forming the stepped structure 242 of the main body portion 241, when a predetermined overcurrent or larger flows in the bus bar 240, the stepped structure 242 of the main body portion 241 may melt and break (disconnected) by high resistance heat, and thus the bus bar 240 may perform a fuse function by the stepped structure 242.

Also, the main body portion 241 may be configured to be electrically connected to at least one secondary battery 100.

Here, the secondary battery 100 may be a pouch type secondary battery 100. In particular, the pouch type secondary battery 100 may include a pouch 120. The secondary battery 100 may include an electrode assembly (not shown) and an electrolyte solution (not shown) accommodated in the pouch 120.

Here, the pouch 120 may be configured of two pouches including a left pouch and a right pouch with an accommodating portion 115 having a concave shape. Also, the electrode assembly and the electrolyte solution may be accommodated in the accommodating portion 115. Also, each of the pouches may include an external insulating layer, a metal layer, and an internal adhesive layer, and the internal adhesive layers may be adhered to each other at an edge region of the pouch 120 to provide a sealing portion. Moreover, a terrace portion may be provided at each of both ends of the pouch 120 where a positive electrode lead 111 and a negative electrode lead 112 are provided.

The electrode assembly is an assembly of an electrode and a separator, wherein at least one positive electrode plate and at least one negative electrode plate are arranged with the separator therebetween. Also, a positive electrode tab may be provided at the positive electrode plate of the electrode assembly, and at least one positive electrode tab may be connected to the positive electrode lead 111.

Here, the positive electrode lead 111 may have one end connected to the positive electrode tab and the other end exposed to the outside of the pouch 120, and such an exposed portion may function as an electrode terminal of the secondary battery 100, for example, a positive electrode terminal of the secondary battery 100.

Also, a negative electrode tab may be provided at the negative electrode plate of the electrode assembly, and at least one negative electrode tab may be connected to the negative electrode lead 112. Also, the negative electrode lead 112 may have one end connected to the negative electrode tab and the other end exposed to the outside of the pouch 120, and such an exposed portion may function as an electrode terminal of the secondary battery 100, for example, a negative electrode terminal of the secondary battery 100.

Moreover, the positive electrode lead 111 and the negative electrode lead 112 may be provided at both ends of the secondary battery 100 in opposite directions (front-and-back direction) based on the center of the secondary battery 100. In other words, the positive electrode lead 111 may be provided at one end based on the center of the secondary battery 100. Also, the negative electrode lead 112 may be provided at the other end based on the center of the secondary battery 100. For example, as shown in FIGS. 1 and 3, each secondary battery 100 may be configured such that the positive electrode lead 111 and the negative electrode lead 112 protrude forward and backward.

Thus, according to such a configuration of the present disclosure, an area of an electrode lead 110 may be increased because there is no interference between the positive electrode lead 111 and the negative electrode lead 112 in one secondary battery 100.

Also, the positive electrode lead 111 and the negative electrode lead 112 may be configured in a plate shape. In particular, the positive electrode lead 111 and the negative electrode lead 112 may protrude in a horizontal direction while being erected such that wide surfaces face the left and the right.

Also, the plurality of secondary batteries 100 may be included in the battery module 300 and arranged to be stacked in at least one direction. For example, the plurality of pouch type secondary batteries 100 may be stacked on each other in parallel in a left-and-right direction.

Here, when viewed from the direction indicated by the arrow F of FIG. 1, each pouch type secondary battery 100 may be arranged to be perpendicularly erected approximately on the ground such that two wide surfaces are respectively positioned at the left and the right and the sealing portions are positioned at top, bottom, front, and back. In other words, each secondary battery 100 may be erected in the up-and-down direction.

However, the battery module 300 according to the present disclosure is not limited by the pouch type secondary battery 100 described above, and various secondary batteries 100 well-known at the time of application of the present disclosure may be employed.

Meanwhile, the main body portion 241 may be configured such that the positive electrode lead 111 or the negative electrode lead 112 of the secondary battery 100 contacts an outer surface of one region. Also, the battery module 300 may further include a connection bus bar 250. Unlike the bus bar 240, the connection bus bar 250 may not have the stepped structure 242. Also, the connection bus bar 250 may have an insertion hole O1 (shown in FIG. 12) such that the positive electrode lead 111 or the negative electrode lead 112 is inserted.

For example, as shown in FIG. 1, the battery module 300 may include two bus bars 240 and 240B configured to be electrically connected to an external device or another battery module. The two bus bars 240 and 240B may both include the current breaking portion 244, or only the bus bar 240 may include the current breaking portion 244. Also, five connection bus bars 250 that do not include the current breaking portion 244 may be provided.

Also, for example, as shown in FIG. 1, the seven bus bars 240, 240B, and 250 may be configured to electrically connect the 12 secondary batteries 100 in parallel and in series. Moreover, the two positive electrode lead 111 or the two negative electrode lead 112, or the positive electrode lead 111 and the negative electrode lead 112 may be connected to the 5 connection bus bars 250. Also, the positive electrode lead 111 or the negative electrode lead 112 may contact the two bus bars 240 and 240B configured to be electrically connected to the external device or another battery module 300.

Referring back to FIGS. 2 through 4, the current breaking portion 244 may be inserted into a space of the main body portion 241, which is formed as the outer surface of the stepped structure 242 is recessed inward. In other words, the current breaking portion 244 may be inserted into the space formed as the stepped structure 242 is recessed while at least a part thereof contacts an inner surface of the space. Alternatively, the current breaking portion 244 may be inserted into the space formed as the stepped structure 242 is recessed to completely fill the space.

In particular, the current breaking portion 244 may be configured to electrically connect both inner side walls of the recessed space of the stepped structure 242, the both inner side walls being spaced apart from each other. For example, the current breaking portion 244 may be configured to contact between the upper wall 242b and the lower wall 242c of the recessed space of the stepped structure 242, which are spaced apart from each other. Moreover, the current breaking portion 244 may be configured to contact the inner side wall 242d of the recessed space of the stepped structure 242.

Also, the current breaking portion 244 may include a second metal having a melting point relatively lower than the first metal. In particular, the second metal may be a material having high electric conductivity and thus capable of delivering electricity with a power loss of less than 40%. For example, the second metal may be aluminum. However, the second metal is not necessarily limited to aluminum, and may be any metal having a melting point lower than the first metal and having excellent electric conductivity, for example, an aluminum alloy.

Thus, according to such a configuration of the present disclosure, by forming the current breaking portion 244 in the internal space formed by the stepped structure 242 of the main body portion 241, when an overcurrent flows in the bus bar 240, the current breaking portion 244 including the second metal having a melting point lower than the first metal may be melted first and flow outside the bus bar 240. In other words, since the current breaking portion 244 is melted and discharged first from the stepped structure 242 of the main body portion 241, a current may be concentrated at a thin thickness portion of the stepped structure 242 of the main body portion 241, and thus the stepped structure 242 of the main body portion 241 may be quickly melted and removed. As such, when the overcurrent flows, the bus bar 240 may quickly achieve disconnection because the current breaking portion 244 and the stepped structure 242 of the main body portion 241 are quickly melted and removed.

Here, the melted current breaking portion 244 may be discharged through a gap between the covering member 245 and the main body portion 241, the gap communicating with the outside. Alternatively, the melted current breaking portion 244 may be absorbed into the covering member 245 or discharged through the covering member 245.

Similarly, the melted stepped structure 242 of the main body portion 241 may be discharged through the gap of the covering member 245, the gap communicating with the outside. Alternatively, the melted stepped structure 242 may be absorbed into the covering member 245 or discharged through a plurality of micropores provided in the covering member 245.

A method of forming the current breaking portion 244 at the main body portion 241 of the bus bar 240 may vary. For example, the current breaking portion 244 may be formed by overlapping a second metal plate including the second metal on a part of a first metal plate including the first metal, and then mechanically combining the first and second metal plates by rolling the second metal plate into the first metal plate in a high temperature environment. In other words, the main body portion 241 and the current breaking portion 244 of the bus bar 240 may be mechanically bonded in a clad form. Here, the first metal and the second metal may be mixed in a part of each of the first metal plate and the second metal plate.

Thus, according to such a configuration of the present disclosure, since the main body portion 241 and the current breaking portion 244 are mechanically combined via rolling, not only electric connectivity between the main body portion 241 and the current breaking portion 244 is excellent, but also a bonding property (adhesive property) is excellent, and thus durability of the bus bar 240 may be prevented from being deteriorated.

Alternatively, the bus bar 240 may form the main body portion 241 and the current breaking portion 244 via casting. In other words, after manufacturing the main body portion 241 having the stepped structure 242 by injecting and hardening the melted first metal in a mold frame, the melted second metal is injected into the mold frame such as to be inserted into the stepped structure 242 of the main body portion 241, and then sufficiently hardened.

An area of a cross section of the stepped region 242a of the stepped structure 242 perpendicular to a current flow direction S may be less than an area of a cross section of the current breaking portion 244 perpendicular to the current flow direction S. In other words, a cross-sectional area of the stepped region 242a of the stepped structure 242 in the horizontal direction perpendicular to the up-and-down direction may be less than a cross-sectional area of the current breaking portion 244 in the horizontal direction.

In other words, the cross-sectional area of the stepped region 242a of the stepped structure 242 may be configured to be relatively less than that of the current breaking portion 244 such that, when an overcurrent flows in the bus bar 240, the current breaking portion 244 is melted and high resistance is generated in the stepped structure 242 of the main body portion 241.

Moreover, a thickness Z of the stepped region 242a of the stepped structure 242 in the front-and-back direction may be thinner than a thickness of the current breaking portion 244 in the front-and-back direction. Also, an outer side surface of the stepped region 242a of the stepped structure 242 may be located to face an inner side surface of the current breaking portion 244. Here, the outer side surface denotes an outer surface located in a direction facing relatively the outside based on the center portion of the battery module 300 among the outer surface of the stepped structure 242. Also, the inner side surface denotes an outer surface located in a direction facing the center portion of the battery module 300 from the outside among the outer surface of the stepped structure 242.

As such, according to such a configuration of the present disclosure, by configuring the thickness or cross-sectional area of the stepped structure 242 of the main body portion 241 to be less than the thickness or cross-sectional area of the current breaking portion 244, high resistance may be generated at the stepped region 242a of the stepped structure 242 of the main body portion 241 and the stepped structure 242 may be definitely and quickly fused off due to the small thickness or cross-sectional area to be melted. In other words, reliability and a reaction rate of the fuse function of the bus bar 240 may be greatly increased.

Figure 5:
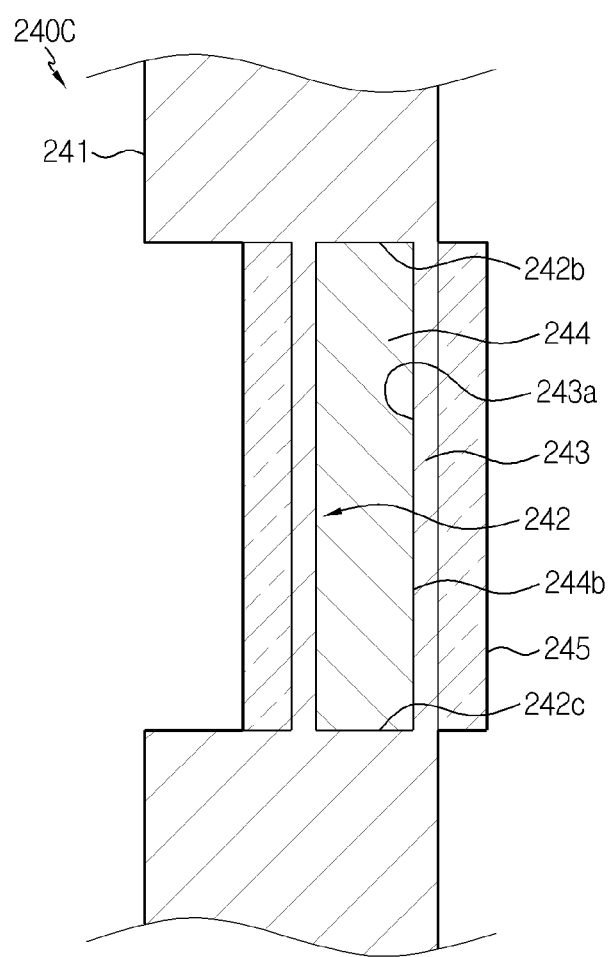
FIG. 5 is a partial cross-sectional view schematically showing one region of a bus bar according to another embodiment of the present disclosure.

FIG. 5 is a partial cross-sectional view schematically showing one region of a bus bar according to another embodiment of the present disclosure.

Referring to FIG. 5, a bus bar 240C shown in FIG. 5 may further include an extending portion 243 that connects both inner side walls of the stepped structure 242, extends to cover the outer side surface of the current breaking portion 244, and includes the first metal compared with the bus bar 240 of FIG. 4. In particular, the bus bar 240C may further include the extending portion 243 configured to connect the upper wall 242b and the lower wall 242c of the recessed space of the stepped structure 242, which are spaced apart from each other. Also, the extending portion 243 may extend to cover an outer side surface 244b of the current breaking portion 244.

For example, as shown in FIG. 5, the extending portion 243 may be provided such that an inner side surface 243a of the extending portion 243 faces the outer side surface 244b of the current breaking portion 244. Also, the main body portion 241 may have the stepped structure 242 facing an inner side surface of the current breaking portion 244.

As such, according to such a configuration of the present disclosure, by providing the extending portion 243 configured to cover the outer side surface 244b of the current breaking portion 244 and connect the upper wall 242b and the lower wall 242c of the recessed space of the stepped structure 242, which are spaced apart from each other, to the bus bar 240C according to another embodiment, durability of a region of the stepped structure 242 of the main body portion 241 into which the current breaking portion 244 is inserted may be reinforced.

Figure 6:
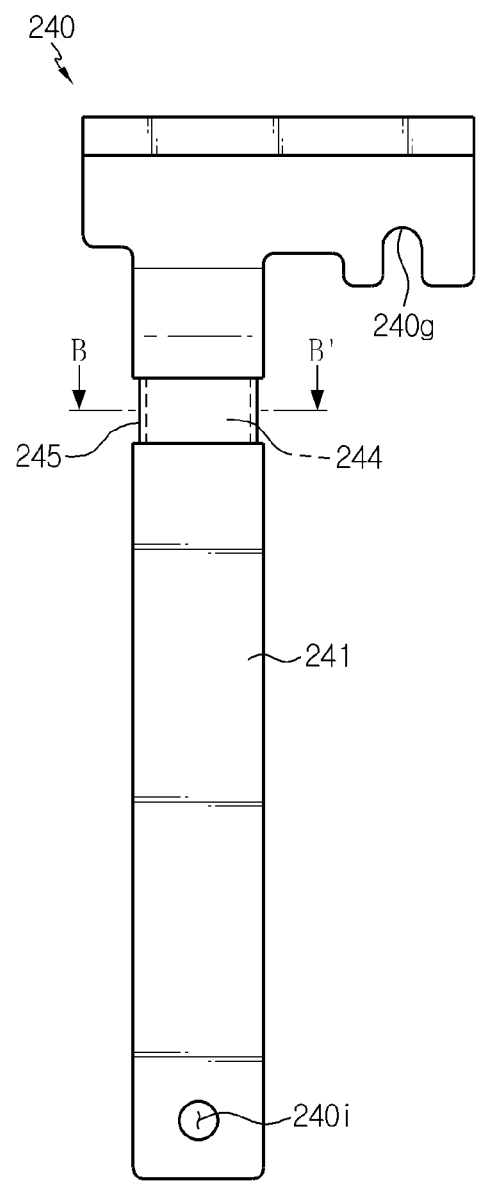
FIG. 6 is a front view schematically showing a bus bar according to an embodiment of the present disclosure.

FIG. 6 is a front view schematically showing a bus bar according to an embodiment of the present disclosure. Also, FIG. 7 is a cross-sectional view schematically showing one region of a bus bar taken along a line B-B' of FIG. 6.

Figure 7:
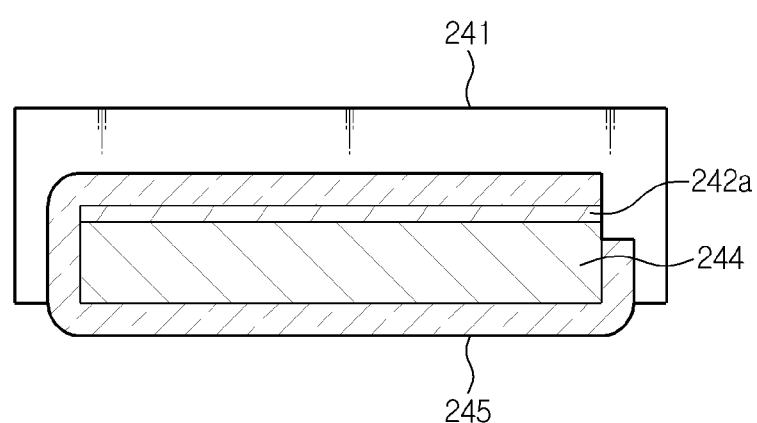
FIG. 7 is a cross-sectional view schematically showing one region of a bus bar taken along a line B-B' of FIG. 6.

Referring to FIGS. 6 and 7 together with FIG. 4, the covering member 245 may include a material having high insulation and excellent heat resistance. In particular, the covering member 245 may include a mica material. Also, the covering member 245 may be in a form of a sheet having a thin thickness. For example, the covering member 245 may be a mica sheet. However, the covering member 245 is not necessarily limited to a mica sheet, and may be any sheet including a material having excellent insulation and heat resistance.

Moreover, the covering member 245 may be configured to surround at least a part of the outer surface of the current breaking portion 244. Also, the covering member 245 may be configured to surround at least a part of the outer surface of the stepped structure 242 of the main body portion 241. For example, as shown in FIG. 7, the bus bar 240 may include the covering member 245 configured to surround the current breaking portion 244 and a part of the outer surface of the main body portion 241.

As such, according to such a configuration of the present disclosure, since the covering member 245 surrounds at least a part of the outer surface of the current breaking portion 244, heat may be blocked when an overcurrent equal to or larger than a predetermined current flows in the bus bar 240 such that resistance heat generated in the current breaking portion 244 does not damage components adjacent to the bus bar 240. Moreover, since the covering member 245 insulates the current breaking portion 244, when an overcurrent flows in the bus bar 240, the temperature of the current breaking portion 244 may be quickly increased. Accordingly, the speed of reactivity of the bus bar 240 with respect to the overcurrent may be increased, and thus a quick current blocking function may be exerted.

Figure 8:
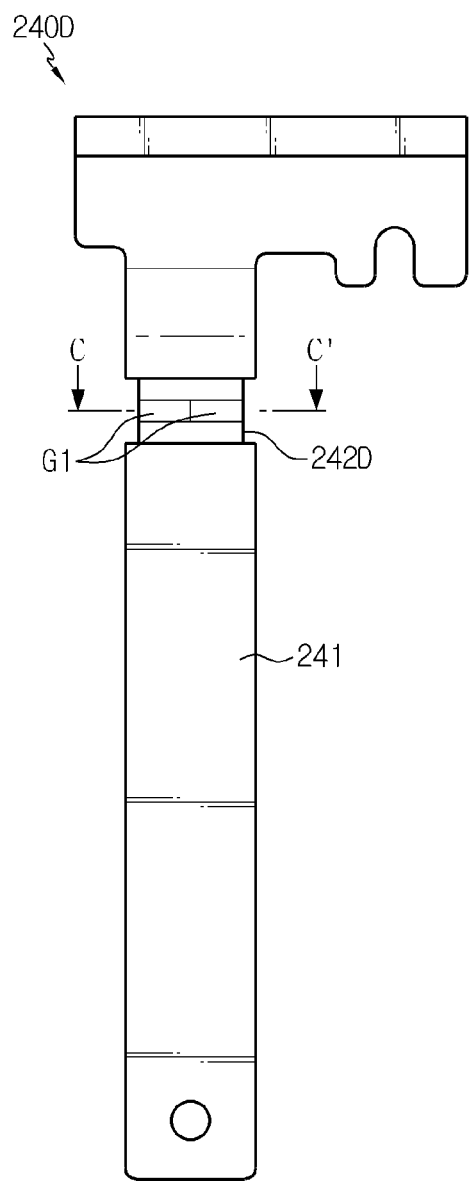
FIG. 8 is a front view schematically showing some components of a bus bar according to another embodiment of the present disclosure.
Figure 9:
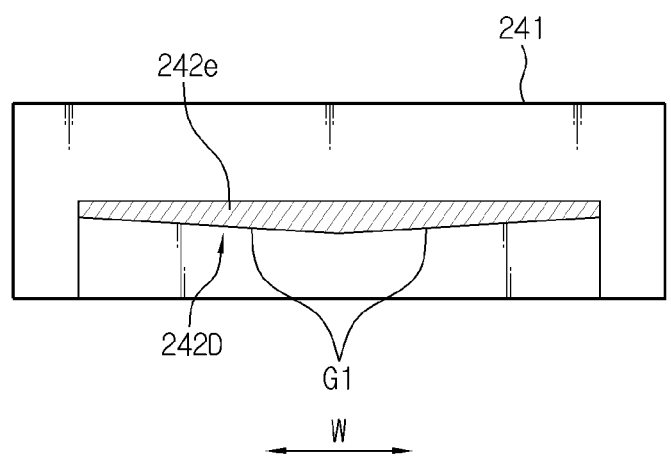
FIG. 9 is a cross-sectional view schematically showing one region of a bus bar taken along a line C-C' of FIG. 8.

FIG. 8 is a front view schematically showing some components of a bus bar according to another embodiment of the present disclosure. Also, FIG. 9 is a cross-sectional view schematically showing one region of a bus bar taken along a line C-C' of FIG. 8. Here, a current breaking portion and a covering member are not shown in FIG. 8 for convenience of description.

Referring to FIGS. 8 and 9, in a bus bar 240D according to another embodiment, a stepped structure 242D of the main body portion 241 of FIG. 8 may further have a discharging structure enabling a current breaking portion melted at an outer side surface of a stepped region 242e to be easily discharged, compared with the stepped structure 242 of the main body portion 241 of FIG. 6.

In particular, the main body portion 241 of FIG. 9 may have, at one region, the stepped structure 242D in which the outer side surface is recessed inward, and the stepped structure 242D of the main body portion 241 may include at least one incline G1 formed by being continuously recessed in the outward direction. Also, the stepped region 242e of the stepped structure 242D may be configured such that a thickness is decreased continuously in the inward direction towards ends in a left-and-right direction indicated by an arrow W.

For example, as shown in FIGS. 8 and 9, one incline G1 extending in the left-and-right direction indicated by the arrow W from the center of the stepped region 242e of the stepped structure 242D of the main body portion 241 may be provided.

As such, according to such a configuration of the present disclosure, by providing the incline G1 to the stepped region 242e of the stepped structure 242D of the main body portion 241, when the current breaking portion is melted, the melted current breaking portion is discharged to the outside by flowing along the incline G1, and thus the melted current breaking portion may be quickly and easily discharged. Accordingly, reactivity of the bus bar 240D with respect to an overcurrent is further increased, thereby achieving quick disconnection.

Figure 10:
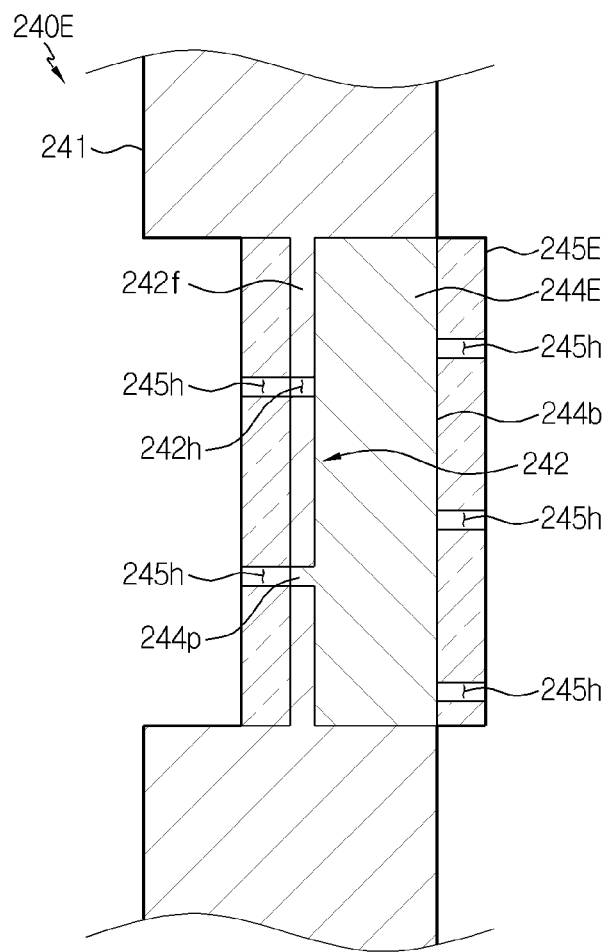
FIG. 10 is a partial cross-sectional view schematically showing one region of a bus bar according to another embodiment of the present disclosure.

FIG. 10 is a partial cross-sectional view schematically showing one region of a bus bar according to another embodiment of the present disclosure.

Referring to FIG. 10 together with FIG. 2, a covering member 245E may include a discharge hole 245h perforated such that the inside and the outside are communicated. In particular, the discharge hole 245h may be a circular opening. Moreover, the discharge hole 245h may be provided at a region facing the outer side surface 244b of a current breaking portion 244E. Also, the discharge hole 245h may be provided at a region facing a stepped region 242f of the stepped structure 242 of the main body portion 241.

For example, as shown in FIG. 10, the covering member 245E may include five discharge holes 245h. Thereamong, two discharge holes 245h may be configured to face the stepped region 242f of the stepped structure 242 of the main body portion 241. Also, thereamong, three discharge holes 245h may be configured to face the outer side surface 244b of the current breaking portion 244E.

As such, according to such a configuration of the present disclosure, by providing the discharge hole 245h to the covering member 245E, the melted current breaking portion 244E or the melted stepped region 242f of the stepped structure 242 of the main body portion 241 may be smoothly discharged to the outside through the discharge hole 245h. Accordingly, quick disconnection may be achieved with respect to an overcurrent of a bus bar 240E.

Also, at least one through hole 242h perforated such that the inside and the outside are communicated may be provided at the stepped region 242f of the stepped structure 242 of the main body portion 241.

Moreover, the current breaking portion 244E may have, at one region, a protruding structure 244p extending to penetrate the through hole 242h provided at the stepped region 242f of the stepped structure 242. Also, the through hole 242h provided at the stepped region 242f of the stepped structure 242 may be located to communicate with the discharge hole 245h of the covering member 245E.

For example, as shown in FIG. 10, two through holes 242h may be provided at the stepped region 242f of the stepped structure 242 of the main body portion 241. Also, the current breaking portion 244E may have the protruding structure 244p extending to penetrate one of the two through holes 242h. In addition, the two through holes 242h may be located to communicate with the discharge hole 245h of the covering member 245E.

As such, according to such a configuration of the present disclosure, by providing the through hole 242h at the stepped region 242f of the stepped structure 242 of the main body portion 241, the melted current breaking portion 244E may be discharged to the outside through the through hole 242h. Also, by locating the through hole 242h to communicate with the discharge hole 245h of the covering member 245E, the melted current breaking portion 244E discharged through the through hole 242h may be finally discharged again to the outside through the discharge hole 245h of the covering member 245E. Accordingly, the reactivity with respect to the overcurrent of the bus bar 240E may be further increased, thereby achieving quick disconnection.

Figure 11:
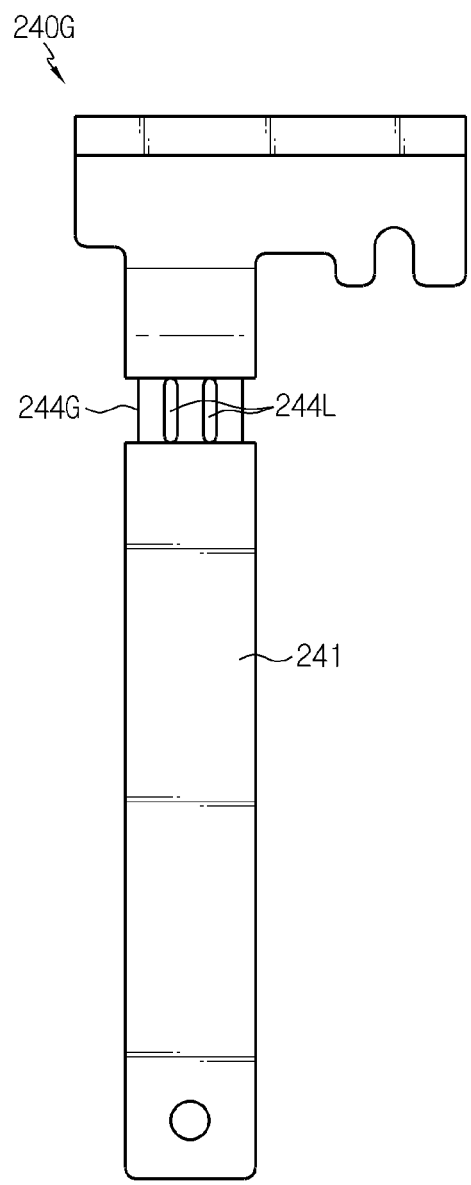
FIG. 11 is a front view schematically showing some components of a bus bar according to another embodiment of the present disclosure.

FIG. 11 is a front view schematically showing some components of a bus bar according to another embodiment of the present disclosure. Here, a covering member is not shown in FIG. 11 for convenience of description.

Referring to FIG. 11, in a bus bar 240G of FIG. 11, at least one slit 244L may be provided at a current breaking portion 244G. Here, the slit 244L may be a narrow and long gap (hole).

Here, the number and size of the slits 244L may be set in consideration of a suitable resistance size for the current breaking portion 244G to perform a fuse function. In other words, when the number and size of the slits 244L are increased, a cross-sectional area of the current breaking portion 244G in the horizontal direction perpendicular to the up-and-down direction is decreased, and thus an electric resistance size may be increased when an electric current is applied. For example, as shown in FIG. 11, the current breaking portion 244G may include two slits 244L.

As such, according to such a configuration of the present disclosure, by providing the at least one slit 244L to the current breaking portion 244G, the suitable resistance size for the current breaking portion 244G to appropriately perform the fuse function may be set. Accordingly, a further accurate fuse function may be performed.

Figure 12:
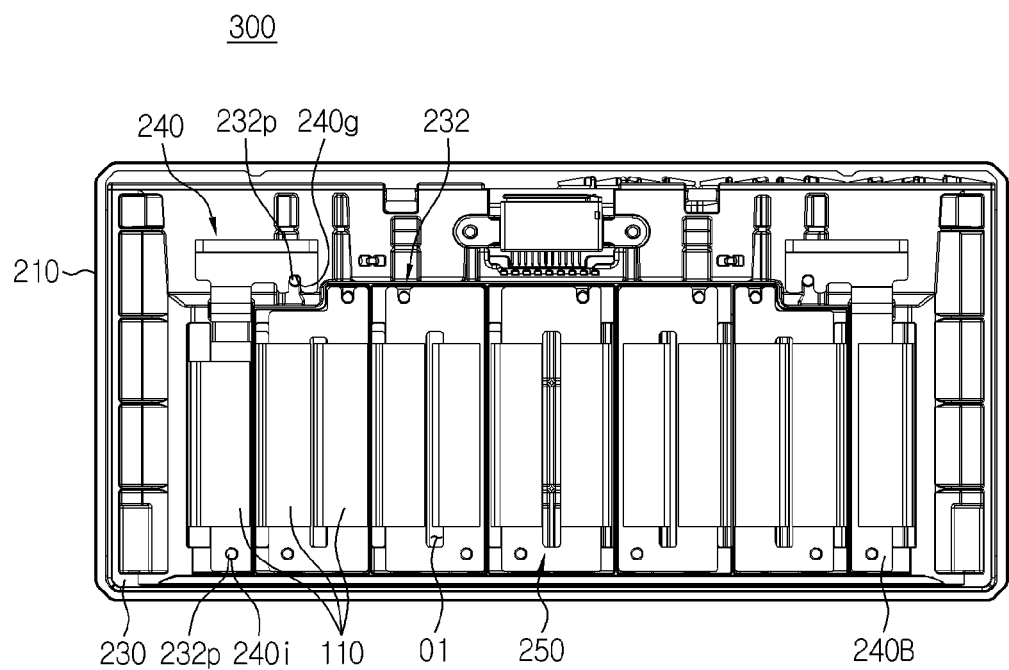
FIG. 12 is a perspective view schematically showing a battery module according to an embodiment of the present disclosure.

FIG. 12 is a perspective view schematically showing a battery module according to an embodiment of the present disclosure.

Referring to FIG. 12 together with FIGS. 1 and 3, the battery module 300 according to the present disclosure may include at least one bus bar 240, a bus bar frame 230, and a module housing 210 in which the plurality of secondary batteries 100 are embedded.

Here, the bus bar 240 may be configured to be electrically connected to the plurality of secondary batteries 100. Also, the battery module 300 may include the same structure and components of the bus bar 240 described above.

The bus bar frame 230 may include an electrically insulating material. For example, the bus bar frame 230 may include at least a plastic material. Moreover, the bus bar frame 230 may be manufactured via injection molding.

Also, the bus bar frame 230 may include a mounting portion 232 such that the bus bar 240 is mounted on an outer side surface. Here, the outer side surface of the bus bar frame 230 denotes an outer surface located in a direction facing relatively the outside based on the center portion of the battery module 300 among the outer surface of the bus bar frame 230. Also, the inner side surface denotes an outer surface located in a direction facing the center portion of the battery module 300 from the outside among the outer surface of the bus bar frame 230.

The mounting portion 232 may have a fixing structure capable of fixing the bus bar 240. For example, the bus bar 240 may include a fixing hole 240i and a fixing groove 240g, and the mounting portion 232 of the bus bar frame 230 may include a fixing protrusion 232p penetrating the fixing hole 240i or inserted into the fixing groove 240g.

For example, as shown in FIG. 12, the fixing groove 240g recessed inward may be provided at the top of the bus bar 240. Also, the fixing hole 240i may be provided at the bottom of the bus bar 240. The fixing protrusion 232p provided at the mounting portion 232 may be inserted into the fixing groove 240g in an upward direction and may penetrate through the fixing hole 240i.

As such, according to such a configuration of the present disclosure, by providing the fixing structure for fixing the bus bar 240 at the mounting portion 232 provided at the bus bar frame 230, the bus bar 240 may be stably fixed and an electrical and physical connection structure between the bus bar 240 and the plurality of secondary batteries 100 may be stably maintained. Accordingly, the durability of the battery module 300 may be effectively increased.

Meanwhile, a battery pack (not shown) according to the present disclosure may include one or more battery modules 300 according to the present disclosure. Also, the battery pack according to the present disclosure may further include, in addition to the battery module 300, a pack case for accommodating the battery module 300 and various apparatuses for controlling charging and discharging of the battery module 300, such as a battery management system (BMS), a current sensor, a fuse, and the like.

Also, the battery pack according to the present disclosure may be applied to means of transportation, such as a vehicle. For example, an electric vehicle according to the present disclosure may include the battery pack according to the present disclosure.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

[List of Reference Numerals]

| | |
|---|---|
| 100: Secondary Battery | 110: Electrode Lead |
| 300: Battery Module | |
| 210: Module Housing | |
| 230: Bus Bar Frame | 232: Mounting Portion |
| 240: Bus Bar | |
| 241: Main Body Portion | 242: Stepped Structure |
| 242a: Stepped Region | 243: Extending Portion |
| 242h: Through Hole | |
| 244: Current Breaking Portion | 244L: Slit |
| 245: Covering Member | 245h: Discharge Hole |
| 244p: Protruding Structure | 250: Connection Bus Bar |

INDUSTRIAL APPLICABILITY

The present disclosure relates to a bus bar including a current breaking portion, and a battery module including the bus bar. Also, the present disclosure is applicable to industries related to a battery pack, a vehicle, and an electronic device including the battery module.

What is claimed is:
1. A bus bar comprising:
a main body portion that is configured to be included in a battery module and comprises a first metal, has a stepped structure, in which an outer surface of the main body portion in an outward direction of the battery module is recessed in an inward direction, formed in one region, and is configured to be electrically connected to at least one secondary battery;
a current breaking portion that is inserted into a space formed by the stepped structure and comprises a second metal having a melting point relatively lower than a melting point of the first metal; and
a covering member configured to surround at least a part of an outer surface of the current breaking portion in the outward direction,
wherein the current breaking portion is configured to electrically connect an upper wall and a lower wall of the space of the stepped structure, which are spaced apart from each other,
wherein an outer side surface of a stepped region of the stepped structure is located to face an inner side surface of the current breaking portion, and
wherein the bus bar further comprises an extending portion extending to connect the upper wall and the lower wall of the recessed space of the stepped structure and covering an outer side surface of the current breaking portion.

2. A bus bar comprising:
a main body portion that is configured to be included in a battery module and comprises a first metal, has a stepped structure, in which an outer surface of the main body portion in an outward direction of the battery module is recessed in an inward direction, formed in one region, and is configured to be electrically connected to at least one secondary battery;
a current breaking portion that is inserted into a space formed by the stepped structure and comprises a second metal having a melting point relatively lower than a melting point of the first metal; and
a covering member configured to surround at least a part of an outer surface of the current breaking portion,
wherein the current breaking portion is configured to electrically connect an upper wall and a lower wall of the space of the stepped structure, which are spaced apart from each other, and
wherein at least one slit is provided in the current breaking portion.

3. A bus bar comprising:
a main body portion that is configured to be included in a battery module and comprises a first metal, has a stepped structure, in which an outer surface of the main body portion in an outward direction of the battery module is recessed in an inward direction, formed in one region, and is configured to be electrically connected to at least one secondary battery;
a current breaking portion that is inserted into a space formed by the stepped structure and comprises a second metal having a melting point relatively lower than a melting point of the first metal; and
a covering member configured to surround at least a part of an outer surface of the current breaking portion,
wherein the current breaking portion is configured to electrically connect an upper wall and a lower wall of the space of the stepped structure, which are spaced apart from each other, and
wherein the covering member includes a discharge hole perforated to communicate with an inside and an outside of the bus bar.

4. The bus bar of claim 3, wherein an area of a cross section of a stepped region of the stepped structure perpendicular to a current flow direction is less than an area of a cross section of the current breaking portion perpendicular to the current flow direction.

5. The bus bar of claim 3, wherein a stepped region of the stepped structure comprises a through hole perforated to communicate with the inside and the outside of the bus bar.

6. The bus bar of claim 5, wherein the current breaking portion has a protruding structure extending and protruding from one region to penetrate the through hole provided at the stepped region of the stepped structure.

7. The bus bar of claim 6, wherein the through hole provided at the stepped region of the stepped structure is located to communicate with the discharge hole of the covering member.

8. The bus bar of claim 3, wherein the covering member is a mica sheet.

9. A battery module comprising:
a plurality of secondary batteries;
the bus bar of claim 3 configured to electrically connect the plurality of secondary batteries; and
a bus bar frame comprising an electrically insulating material and configured to mount the bus bar on an outer side surface thereof.

10. A battery pack comprising at least one battery module of claim 9.

11. The bus bar of claim 3, wherein the stepped structure includes at least one inclined surface with respect to the outward direction.

12. The bus bar of claim 3, wherein a thickness of the stepped structure is decreased continuously in the inward direction toward a side end thereof.

13. The bus bar of claim 1, wherein the extending portion comprises the first metal.

14. A bus bar comprising:
a main body portion that is configured to be included in a battery module and comprises a first metal, has a stepped structure, in which an outer surface of the main body portion in an outward direction of the battery module is recessed in an inward direction, formed in one region, and is configured to be electrically connected to at least one secondary battery;
a current breaking portion that is inserted into a space formed by the stepped structure and comprises a second metal having a melting point relatively lower than a melting point of the first metal; and
a covering member configured to surround at least a part of an outer surface of the current breaking portion,
wherein the current breaking portion is configured to electrically connect an upper wall and a lower wall of the space of the stepped structure, which are spaced apart from each other, and
wherein a stepped region of the stepped structure comprises a through hole perforated to communicate with an inside and an outside of the bus bar.

15. The bus bar of claim 1, wherein the covering member is a mica sheet.

16. A battery module comprising:
a plurality of secondary batteries;
the bus bar of claim 1 configured to electrically connect the plurality of secondary batteries; and
a bus bar frame comprising an electrically insulating material and configured to mount the bus bar on an outer side surface thereof.

17. A battery pack comprising at least one battery module of claim 16.

18. The bus bar of claim 2, wherein the covering member is a mica sheet.

19. A battery module comprising:
a plurality of secondary batteries;
the bus bar of claim 2 configured to electrically connect the plurality of secondary batteries; and
a bus bar frame comprising an electrically insulating material and configured to mount the bus bar on an outer side surface thereof.

20. A battery pack comprising at least one battery module of claim 19.

* * * * *